UNITED STATES PATENT OFFICE.

MAX LEONARD TOWER AND FREDERIK LANGE BEGTRUP, OF MIDDLEPORT, NEW YORK, ASSIGNORS TO NIAGARA SPRAYER CO., OF MIDDLEPORT, NEW YORK, A CORPORATION.

PROCESS OF MAKING LEAD ARSENATE.

1,387,213.   Specification of Letters Patent.   Patented Aug. 9, 1921.

No Drawing.   Application filed August 31, 1920. Serial No. 407,198.

*To all whom it may concern:*

Be it known that we, MAX L. TOWER and FREDERIK L. BEGTRUP, citizens of the United States and subjects of the King of Denmark, respectively, and both residents of Middleport, in the county of Niagara and State of New York, have invented a new and Improved Process of Making Lead Arsenate, of which the following is a full, clear, and exact description.

This invention relates to a process of making lead arsenate, and has reference more particularly to a process of the class indicated in which a catalyst is used to hasten the reaction between the litharge and arsenic acid.

Heretofore in the manufacture of lead arsenate for use as an insecticide, it has been necessary to use a special grade of litharge which is more expensive, and therefore increases the cost of manufacture of the lead arsenate. Also, in some of the known processes, it has been necessary to use special apparatus which is resistant to the reagents used, and this special apparatus increases the cost of installation of a manufacturing plant. With many of the processes used now, the arsenate of lead formed is very soluble which makes a low percentage of recovery on filtration, and also makes the lead arsenate unsuitable for use as an insecticide. The reaction between litharge and arsenic acid takes place with extreme difficulty if at all, and all processes used heretofore use a basic or acid catalyst to speed up the reaction, but none employ a neutral salt as a catalyst.

An object of this invention, therefore, is to provide a process of making lead arsenate in which the cheaper grades of technical litharge can be used.

Another object of this invention is to provide a process in which the liquors used are acid only with dilute arsenic acid so that cheap apparatus such as ordinary wooden tubs and iron pipes can be used, which decreases the cost of construction of a manufacturing plant.

A further object of this invention is to produce lead arsenate by the process indicated having a low solubility, so that the recovery in filtration will be maximum, and the lead arsenate will be especially suitable for use as an insecticide.

A still further object of this invention is to provide a neutral salt as a catalyst in facilitating the reaction between heavy litharge and arsenic acid, said catalyst being very cheap and being used over and over again in the same mother liquor, it being necessary only to replace the slight loss of a mechanical nature.

Our process consists essentially in acting upon heavy litharge with arsenic acid in the presence of a catalyst consisting of a soluble nitrate such as sodium, potassium, magnesium, calcium, or other nitrate. We prefer to use calcium nitrate since its action seems to hasten the reaction more decidedly than the other nitrates. The reaction can take place in the cold but is accelerated by the application of heat, which is best applied by closed steam coils in order not to increase the volume of the solution to be handled, although an open steam jet can be used. The lead arsenate formed is filtered off and the mother liquor containing a small percentage of arsenic acid and the calcium nitrate is used over and over again for succeeding batches. The action of the soluble nitrate appears to be that of electrolyte, as by careful laboratory experience we have found that during the course of the reaction, no free nitric acid is liberated by the action of arsenic acid on the soluble nitrate.

On a large scale we make up a batch of about the following size, although this size and the relative proportions of the ingredients can be varied through wide limits.

In a tank which contains about 2000 gallons of water, we dissolve about 400 pounds of calcium nitrate. About 2675 pounds of litharge is next sifted in with constant agitation. When all the litharge is well suspended, about 2500 pounds of 75% arsenic acid is added, which is about 10% excess over the theoretical amount necessary. The whole mass is heated by direct steam or preferably by steam heated closed coils, and after the reaction is complete the mixture is passed through the filter press while hot and is well washed until free of arsenic acid. The filter cake of lead arsenate is then dried by any well known means. The filtrate or mother liquor from the filter press and the first portions from the wash water are transferred from the reaction tank for the preparation of a second batch of material, and a small quantity of calcium nitrate is added to balance the mechanical losses and the reaction is repeated. In the second and succeeding batches about 2285 pounds of arsenic acid is added which is just the theoretical quantity necessary to combine with the litharge, most of the 10% excess arsenic acid, which seems to facilitate the reaction, having been carried forward in the mother liquor.

We find that this process is especially advantageous in that any ordinary grade of heavy litharge can be used to advantage, while with other processes it has always been necessary to use a special or more expensive grade of litharge. The mother liquor is acid with the dilute arsenic acid only, and can be handled in ordinary wooden tubs and iron pipes, which decreases the expense which would be necessary if special construction materials had to be used. We find that the arsenate of lead formed has a very low solubility so that separation by filtration is nearly perfect, the slightly soluble lead arsenate is especially suitable for use as an insecticide and the product is in an unusually fine state of division. As far as we know, no other process employs a neutral salt as a catalyst in facilitating the reaction between the heavy litharge and arsenic acid, and we find that the neutral calcium nitrate is especially advantageous in speeding up the reaction so that a manufacturing plant has a larger output for a given size. The calcium nitrate is very cheap and may be used again and again in the same mother liquor, it being necessary only to replace the slight loss of a mechanical nature.

We would state in conclusion that while the example described constitutes a practical embodiment of our invention, we do not limit ourselves precisely to the details herein set forth, since manifestly the same can be considerably varied without departure from the spirit of the invention as defined in the appended claims.

Having thus described our invention, we claim as new and desire to secure by Letters Patent:

1. A process of making lead arsenate, which consists in treating litharge with arsenic acid in the presence of a neutral nitrate.

2. A process of making lead arsenate, which consists in treating litharge with arsenic acid in the presence of a calcium nitrate.

3. A process of making lead arsenate, which consists in treating litharge with arsenic acid in the presence of calcium nitrate at an elevated temperature.

4. A process of making lead arsenate which consists in treating litharge with arsenic acid in excess of the theoretical amount, and in the presence of calcium nitrate as a catalyst.

5. A process of making lead arsenate which consists in adding about 2675 pounds of litharge to a solution of about 400 pounds of calcium nitrate in about 2000 gallons of water with constant agitation, and adding about 2500 pounds of 75% arsenic acid to the mixture.

6. A process of making lead arsenate, which consists in adding about 2675 pounds of litharge to a solution of about 400 pounds of calcium nitrate in about 2000 gallons of water with constant agitation, adding about 2500 pounds of 75% arsenic acid to the mixture, separating the resulting lead arsenate by filtration, and washing and drying said lead arsenate.

7. A process of making lead arsenate which consists in adding about 2675 pounds of litharge to a solution of about 400 pounds of calcium nitrate in about 2000 gallons of water with constant agitation, adding about 2500 pounds of 75% arsenic acid to the mixture, separating the lead arsenate by filtration, washing and drying the lead arsenate, and adding about 2675 pounds of litharge, and about 2285 pounds of arsenic acid to the filtrate and first wash water for the production of a new quantity of lead arsenate.

MAX LEONARD TOWER.
FREDERIK LANGE BEGTRUP.